(12) United States Patent
Abadi et al.

(10) Patent No.: US 7,203,833 B1
(45) Date of Patent: Apr. 10, 2007

(54) HISTORY BASED RIGHTS COMPUTATION FOR MANAGED CODE

(75) Inventors: Martín Abadi, Palo Alto, CA (US); Cédric A. M. Fournet, Cambridge (GB)

(73) Assignee: Microsoft Corporation, Redmond, WA (US)

(*) Notice: Subject to any disclaimer, the term of this patent is extended or adjusted under 35 U.S.C. 154(b) by 772 days.

(21) Appl. No.: 10/329,193

(22) Filed: Dec. 23, 2002

(51) Int. Cl.
*H04L 9/00* (2006.01)
*G06F 15/18* (2006.01)
*G06F 15/173* (2006.01)
*G06F 9/44* (2006.01)

(52) U.S. Cl. .................. 713/167; 713/164; 726/22; 717/127; 717/131; 705/59

(58) Field of Classification Search ........ 713/164–167; 726/22, 30; 709/223–224, 226; 717/131, 717/127; 705/59
See application file for complete search history.

(56) References Cited

U.S. PATENT DOCUMENTS 6,189,103 B1* 2/2001 Nevarez et al. ............. 726/5
6,460,141 B1* 10/2002 Olden ........................ 726/4
6,895,503 B2* 5/2005 Tadayon et al. ........... 713/168

OTHER PUBLICATIONS

Bershad, B.N. et al., "Extensibility, Safety and Performance in the SPIN Operating Systems," *Proceedings of the 15th ACM Symposium on Operating System Principles*, 1995, 267-283.

Brewer, D.F.C. et al., "The Chinese Wall Security Policy," *Proceedings of the 1989 IEEE Symposium on Security and Privacy*, 1989, 206-214.

Edjlali, G. et al., "History-based Access Control for Mobile Code," *ACM Conference on Computer and Communications Security*, 1998, 38-48.

Erlingsson, U. et al., "IRM Enforcement of Java Stack Inspection," *Proceedings of the 2000 IEEE Symposium on Security and Privacy*, Berkeley, CA, May 14-17, 2000, 246-255.

Fournet, C. et al., "Stack Inspection: Theory and Variants," *POPL 2002: The 29th ACM SIGPLAN-SIGACT Symposium on Principles of Programming Languages*, Portland, OR, Jan. 16-18, 2002, 307-318.

Hardy, N., "The Confused Deputy," *ACM Operating Systems Review*, 1999, 24(4), 36-38.

Jensen, T. et al., "Verification of Control Flow Based Security Properties," *Proceedings of the 1999 IEEE Symposium on Security and Privacy*, 1999, 89-103.

(Continued)

*Primary Examiner*—Emmanuel L. Moise
*Assistant Examiner*—Minh Dieu Nguyen
(74) *Attorney, Agent, or Firm*—Woodcock Washburn LLP

(57) ABSTRACT

In the access control model of security, an access control matrix associates rights for operations on objects with subjects. An approach for assigning rights to code at run-time involves determining the run-time rights of a piece of code by examining the attributes of the pieces of code that have run (including their origins) and any explicit requests to augment rights. Thus, this approach relies on the execution history for security. This history based approach reduces the difficulties and the error-proneness of securing extensible software systems.

54 Claims, 7 Drawing Sheets

OTHER PUBLICATIONS

Myers, A.C., "JFlow: Practical, Mostly-Static Information Flow Control," *POPL 1999: The 26th ACM Symposium on Principles of Programming Languages*, San Antonio, TX, 1999, 228-241.

Pottier, F. et al., "A Systematic Approach to Access Control," *Programming Languages and Systems (ESOP 2001)*, Genova, Italy, Apr. 2-6, 2001, vol. 2028 of LNCS, 30-45.

Saltzer, J.H., "Protection and Control of Information Sharing in Multics," *Communications of the ACM*, 1974, 17(7), 388-402.

Schneider, F.B., "Enforceable Security Policies," *ACM Trans. on Information and System Security*, 2000, 3(1), 30-50.

Schroeder, M.D. et al., "A Hardware Architecture for Implementing Protection Rings," *Communications of the ACM*, 1972, 15(3), 157-170.

Wallach, D.S. et al., SAFKASI: A Security Mechanism for Language-Based Systems, *ACM Transactions on Software Engineering and Methodology*, 2000, 9(4), 341-378.

"Access Control based on Execution History," *Proceedings CCS'02*, May 10, 2002, 1-19.

".NET Security," http://msnd.microsoft.com/nhp, 2003, 2 pages.

"ECMA C#and Common Language Infrastructure Standards," http://msdn.microsof.com/net/ecma/, 2003, 3 pages.

Got Dot Net, "About the Common Language Runtime (CLR)," http://ww2w.gotdotnet.com/team/clr/about_clr.aspx, Dec. 2001, 2 pages.

Visual Studio.net, "Microsoft .NET Language Partners," http://msdn.microsoft.com/vstudio/partners/language/default.asp, 2002, 4 pages.

Box, D., *Essential .NET vol. 1: The Common Language Runtime*, Addison Wesley, 2002, pp. 281-325.

Denning, D., *Cryptography and Data Security*, Addison Wesley, 1992, pp. 265-329.

Gong, L., *Inside Java™ 2 Platform Security*, Addison Wesley, 1999, pp. 90-106.

Lange, S. et al., *.NET Framework Security*, Addison Wesley, 2002, 69-98.

Solomon, D.A. et al., *Inside Microsoft Windows 2000*, Microsoft Press, Third edition, 2000, p. 506.

\* cited by examiner

HISTORY BASED RIGHTS COMPUTATION FOR MANAGED CODE

COPYRIGHT NOTICE/PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to computer systems and security for such systems, and more particularly to a method and system for implementing history-based rights computations for managed code.

BACKGROUND OF THE INVENTION

In an extensible software system where subjects and pieces of code are trusted to varying degrees, it is both important and challenging to manage the permissions of running programs in order to avoid security holes. One particular difficulty that has attracted considerable attention is the so-called "confused deputy" problem, which has been addressed by the technique of stack inspection. The present invention is by no means limited to methods for addressing the confused deputy problem; nonetheless, in order to appreciate the background of the present invention, it is helpful to understand this problem and attempted solutions.

Confused Deputy Problem and Stack Inspection

The confused deputy problem may be described as follows. Suppose that a piece of untrusted code calls a piece of trusted code, such as a library function, perhaps passing some unexpected values as arguments to the call, or in an unexpected execution state. The trusted code may invoke some sensitive, security-critical operations, for example, operations on an underlying file system. It is important that these operations be invoked with the "right" level of privilege, taking into account that the call is the result of actions of untrusted code. Moreover, this security guarantee should be achieved under the constraint that we would not expect every library function to be rewritten; only a fraction of the code may ever be security-aware.

One approach to addressing this problem is the technique called "stack inspection," which is presently embodied in the CLR (Common Language Runtime) and in Java Virtual Machines. Following this technique, an upper bound on its permissions is associated statically (that is, before execution) with each piece of code, typically by considering the origin of the piece of code. For example, whenever a piece of code is loaded from an untrusted Internet site, it may be decided that this piece will have at most the right to access temporary files, but will have no other rights during execution. At run-time, the permissions of a piece of code are the intersection of all the static permissions of the pieces of code on the stack. Thus, the run-time permissions associated with a sensitive request made by a trusted piece of code after it is called by an untrusted piece of code include only permissions granted statically to both pieces of code. An exception to this policy is made for situations in which a trusted piece of code explicitly amplifies the run-time permissions. Such amplifications are dangerous, so they should only be done after adequate checking.

Although the stack inspection technique has been widely deployed, it has a number of shortcomings. One of the main ones is that it attempts to protect callees from their callers, but it ignores the fact that, symmetrically, callers may be endangered by their callees. (Similar issues arise in connection with other flows of control such as exception handling, callbacks, and higher-order programming.) If A calls B, B returns (perhaps with an unexpected result or leaving the system in an unexpected state), and then A calls C, the call to C depends on the earlier call to B, and security may depend on tracking this dependency, which stack inspection ignores. In theory, one could argue that A should be responsible for checking that B is "good" or that it does not do anything "bad". However, this checking is difficult and impractical, for a variety of reasons. In particular, A may be a library function, which was coded without these security concerns in mind, and which we may not like to recode. (Indeed, one of the appeals of stack inspection is that it avoids some security problems without the need to recode such functions.) Moreover, the call to B may be a virtual code (that is, a dynamically dispatched code), whose target (B) is hard to determine until run-time.

This shortcoming of stack inspection is a real source of errors with serious security ramifications. From a more fundamental perspective, we can argue that stack inspection addresses only one aspect of the "confused deputy" problem. Other techniques are needed in order to achieve a more complete solution, with satisfactory practical and theoretical properties.

Stack inspection presents other difficulties because of its somewhat exotic, ad hoc character. It is a unique mechanism, separate and distinct from other security mechanisms such as may be provided by an underlying operating system. As a result, it is hard to translate the security state of a virtual machine that uses stack inspection into a corresponding state that would be meaningful at the operating system level. Such a translation is often desirable when a thread in the virtual machine makes a call outside the virtual machine (a local system call, or even a call across a network). In another direction, it is hard to relate stack inspection to execution models for certain high-level languages. For example, programmers in functional languages such as Haskell are not encouraged to think in terms of stacks, so the stacks of the CLR implementation are not an appropriate abstraction for their understanding of security. Finally, the fact that stack inspection is directly related to a particular stack-based execution strategy complicates and hinders optimizations that would affect the stack.

In light of these difficulties and shortcomings, we should look for alternatives to stack inspection. An interesting idea is to rely on information-flow control, of the kind studied in the security literature (particularly in the context of multi-level security). Unfortunately, information-flow control has rarely been practical, and it is not clear whether it can be useful in the CLR and related systems. Nevertheless, it provides an interesting point of comparison and theoretical background; the work of Fournet and Gordon explores the application of techniques directly based on information-flow control (see, Fournet and Gordon, *Stack Inspection: Theory and Variants*, in 29$^{th}$ ACM Symposium on Principles of Programming Languages (POPL '02), pp. 307–318, January 2002).

SUMMARY OF THE INVENTION

The present invention concerns another alternative to stack inspection. According to our method, the run-time rights of a piece of code are determined by examining the attributes of the pieces of code that have run and any explicit requests to augment rights. (In this context, the term "piece of code" may include any collection of program fragments, in source, intermediate, or binary form, and possibly any state associated with those program fragments.) Thus, we rely on the execution history (rather than the stack, which is an imperfect record of the history) for security.

In a presently preferred implementation of the invention, a history-based method for controlling access to resources of a computer system includes assigning rights to a piece of code at run-time, by examining the attributes of multiple pieces of code that have run, including examining their origins and any explicit requests to augment rights. In the preferred implementation, this method further comprises: associating static rights with each of a plurality of pieces of code; at run-time, associating current rights with each execution unit; storing the current rights in such a way that programs can access them; and, when a given piece of code executes, updating the current rights for that code by determining the intersection of the previous current rights with the static rights of the piece of code. In the context of the present invention, the term "resource" includes but is not limited to objects, files, and the like, upon which sensitive operations may be performed.

Other features and aspects of the present invention are described below.

BRIEF DESCRIPTION OF THE DRAWINGS

FIG. 3A illustrates a layered architecture for access control. FIG. 3B illustrates a simple set mechanism for access control for untrusted code. FIG. 3C illustrates the confused deputy problem. FIG. 3D depicts the usage of static rights attached to every piece of code to make access control decision, focusing on a single permission FileIO that is meant to protect access to the file system. FIG. 3E illustrates the limitations of stack inspection: some control and data flows are not tracked in the stack.

FIG. 4A illustrates a basic case without amplification. FIG. 4B illustrates the same case as FIG. 4A in more detail, making explicit the current rights (represented as a set D), in relation to the static permissions of the trusted code and of the applet (represented as sets T and A, respectively). FIG. 4C supplements the case of FIG. 4B with the explicit amplifications of the current rights in trusted code, using the Accept and Grant constructs. FIG. 4D illustrates the same case in more detail, making explicit the value of the current rights D.

DETAILED DESCRIPTION OF PREFERRED EMBODIMENTS

We will now describe presently preferred implementations of the invention. First, in section A, we will describe an exemplary computing environment with reference to FIG. 1. This description is primarily intended to show that the invention may be embodied in a wide variety of ways, e.g., in a software-based process carried out on a general purpose computer or in a computer-readable storage medium. Next, in section B, we describe presently preferred implementations of a system performing the inventive history based rights management computation. Section B focuses mainly on the following aspects of the present invention: static rights, execution units, current rights, access, updating, explicit modification, and programming patterns. Section B also provides two simple examples in C# (pronounced C-sharp), as well as examples of high level constructs (also in C#). Further, section B provides a brief discussion of the implementations depicted in FIGS. 2–4, which are by no means limiting but rather are illustrative of how the present invention may be implemented and distinguished from the prior art. Finally, section C provides a conclusion of the written description and a transition to the claims.

A. Exemplary Computing Environment

Figure 1:
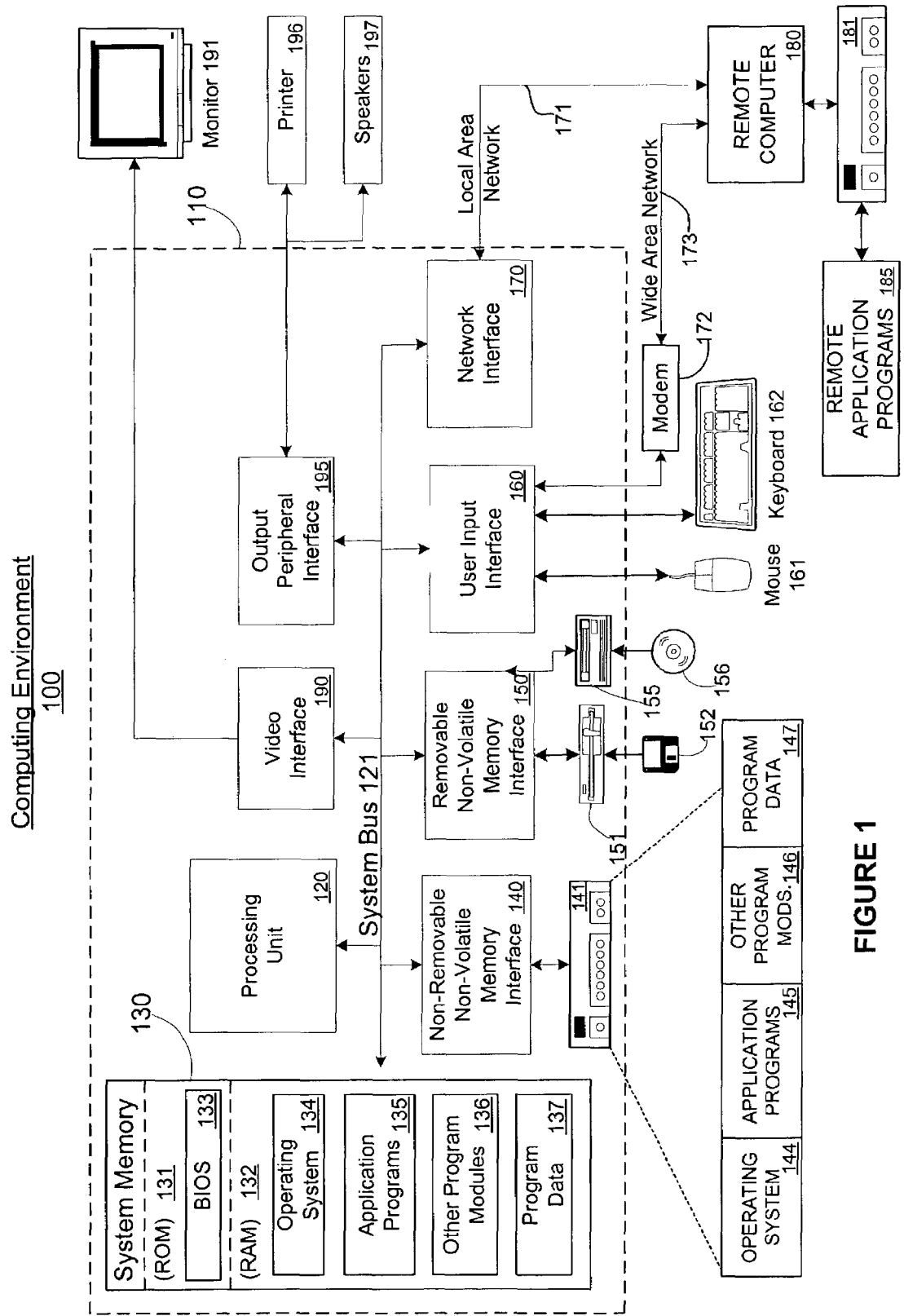
FIG. 1 schematically depicts an exemplary computing environment suitable (but not required) for practicing the present invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, disk controllers, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish (where the dish is used to receive signals to be input to a computer), scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, storage area networks (SANs), intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. History Based Rights Management Computation

In the access control model of security, an access control matrix associates rights for operations on objects with subjects. The objects may for example be files and devices; the subjects may for example be users; the operations may be reading and writing. In systems that rely on access control for security (and most do), a frequent issue is the association of rights with code. For example, a piece of code may be given the rights of the subject (user) who executes the code, those of the author of the code, or some combination of the two. These rights determine whether the code can perform sensitive operations (e.g., reading and writing files).

Computing environments (such as Microsoft's Common Language Runtime and others) provide support for associating rights with managed code, under configurable security policies. The management of rights has led to elaborate constructs and mechanisms, including a technique for determining the run-time rights of a piece of code as a function of the state of the execution stack, and an associated requirement that programmers code certain security checks.

The present invention concerns an alternative design and mechanisms for assigning rights to code at run-time. In short, the run-time rights of a piece of code are determined by examining the attributes of the pieces of code that have run (including their origins) and any explicit requests to augment rights.

This design addresses security concerns while simplifying the tasks of programmers and thereby avoiding security pitfalls. Although widely applicable, the present invention is particularly motivated by the characteristics and needs of the CLR. In this context, the design also enables an effective, smoother cooperation with the security mechanisms of an underlying operating system. The resulting language constructs can be implemented directly and efficiently using a small amount of auxiliary state.

Briefly, the CLR is a runtime system, i.e., a code library that links with an application, controls its loading and execution, and provides basic services such as, e.g., memory management. However, applications that run under the CLR, called managed code, also rely on the CLR to enforce many basic rules and to perform many low-level tasks that programming languages or developers themselves would otherwise have to do. As a result, managed code can provide a higher level of security and reliability than conventional unmanaged code, and it can offer a uniform environment across programming languages.

As mentioned, the run-time rights of a piece of code are determined systematically by examining the attributes of the pieces of code that have run before and any explicit requests to augment rights. The pieces of code that have run include those on the stack but also some that have been called and returned. For example, if A calls B, B returns, then A calls C, the run-time rights in effect within C will in general depend on the fact that B has executed. The attributes in question include in particular the origins of the pieces of code (whether they come from the local disk, digitally signed by a trusted party, from an untrusted Internet site, etc.); they may also include certain properties that can be determined by automated code analysis.

A particular, important way to compute run-time rights is as an intersection, more specifically as the intersection of rights associated with each of the pieces of code that have run. Next we focus on this approach and refer generally to the process 200 depicted in FIG. 2.

Figure 2:
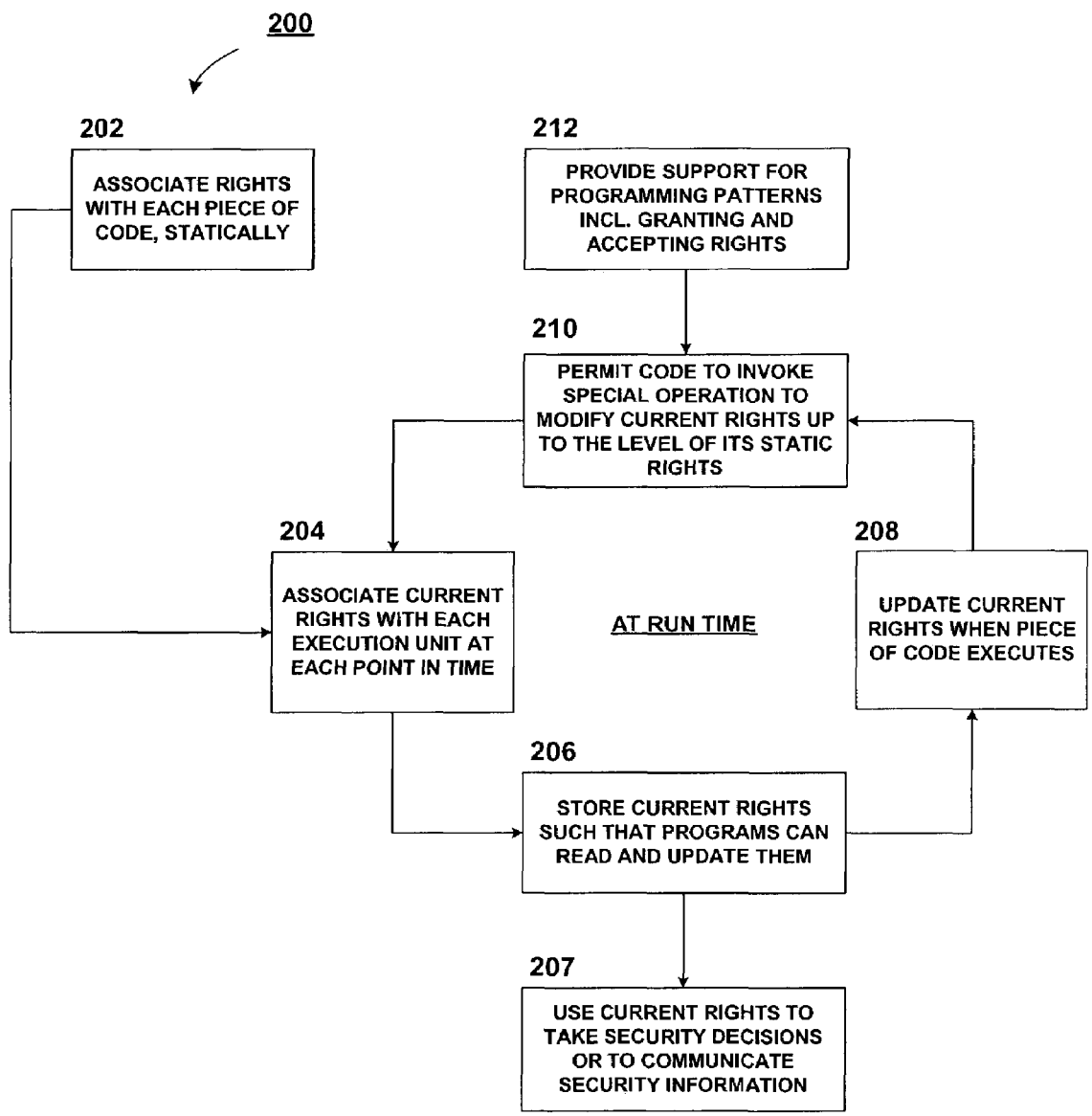
FIG. 2 is a diagram of a method and system for providing access control based on execution history in accordance with a presently preferred implementation of the present invention.

Specifically, this approach is as follows:
1. We associate some rights with each piece of code, statically (at compile time or load time). We refer to these rights as static rights. (FIG. 2, step 202).
2. At run-time, we associate current rights with each execution unit at each point in time. (In this context, a point in time can be any time during system execution.) (FIG. 2, step 204).
3. These current rights are stored in such a way that programs can access them, that is, read them and update them (subject to the conditions given next). In particular, an ordinary variable can represent these current rights. (FIG. 2, step 206).
4. These current rights are the ones considered by default when security decisions need to be taken or when security information needs to be communicated to other system components. Examples of security decisions include decisions of whether to allow: reading and writing of files, access to external networks, displaying of information to a monitor, access to information in memory, invocation of another program or system function, etc. (FIG. 2, step 207).
5. Whenever a piece of code executes, the current rights are updated: the new current rights are the intersection of the old current rights with the static rights of the piece of code. (FIG. 2, step 208).
6. At its discretion, a piece of code may invoke a special operation to modify the current rights. This operation will at most restore the static rights of this code, and it may be further constrained. (FIG. 2, step 210).
7. The controlled modification of rights results in some useful programming patterns. These patterns can be supported with special syntax for "granting" and "accepting" rights. (FIG. 2, step 212).

We expand on each of these points below.

Static Rights

Concerning point (1), the static rights of a piece of code may depend on the origin and the properties of the code, as explained above. They typically do not change once the code is loaded. Like the current rights (see point (4)), the static rights are kept in such a way that programs can read them (but the static rights are typically not updated). The implementation of the association of static rights with code is fairly standard; it is analogous to what happens in stack inspection. In fact, the details can be worked out so as to keep compatibility with the existing mechanisms. In particular, we can represent rights by objects of a class Permission (which we may informally call permissions), and we may use existing techniques for expressing the security policies that associate pieces of code with permissions.

Execution Unit

Concerning point (2), the execution unit may be a thread. In that case, whenever a thread is forked, it should start with the current rights of its parent, by default. When two threads join, their current rights should be intersected. Alternatively, the execution unit may be a collection of threads, possibly a complete process containing many related threads. There are implementation and usability issues in choosing the size of execution units.

Current Rights

Concerning point (3), the current rights can in particular be used in calls on services of an underlying operating system and in calls to execution environments on remote machines. It is particularly attractive to avoid complicated translations of rights for these calls, as those translations can be expensive and inaccurate. Those complicated translations are easy to avoid if the current rights are exactly those of one particular user of the underlying operating system. In that special case, the user identity for that user can be employed as the representation for those rights. We can generalize from this special case by keeping track of rights in terms of code origins (as explained above). For example, in the context of the NT operating system, the mechanism of "restricted tokens" offers additional opportunities. This mechanism enables us to construct a disjunction of a user id with some set of special tokens to represent limitations of rights; this disjunction corresponds to the intersection of rights described in point (5).

Access

Concerning point (4), storing the current rights in a variable, or in related ways, opens a number of opportunities:

(i) Security-aware programs can implement flexible control, without the need for any additional run-time support.

(ii) It is possible to write security-aware wrappers that depend on the security state.

(iii) A variety of optimizations can be applied; the problem of optimizing programs with mutable variables is a well-understood one.

(iv) In particular, the variable may be held in a register.

(v) From the point of view of a programmer in a high-level language, a variable is easy to understand. Even in functional languages such as Haskell, there is the possibility of modeling mutable variables such as the one in question. (It is less standard and mundane to model a stack.)

The variable may be per-thread or per-process, depending on the chosen level of execution unit. Note that, in any case, there is no need to "walk" an execution stack in order to make security decisions.

The set of rights may be explicitly represented by a list. However, alternative representations are possible, such as the following:

(i) A symbolic expression whose value is a set of rights. The symbolic expression can be constructed using standard set union, intersection, and restriction operations. It may be simplified lazily (as the rights are used) or eagerly (as the expression is constructed).

(ii) A symbolic expression whose value is a set of code origins (such as users or network addresses). Again, the symbolic expression can be constructed using standard operations, and the expression may be simplified lazily or eagerly. Moreover, the associated rights can be computed as a function of these code origins, lazily, whenever they are needed. In this case, we use the disjunction of code origins as the dual to the intersection of rights. In other words, we may, for example, keep track of the fact that all the code comes from P or Q, rather than the intersection of the rights associated with P and Q.

(iii) A mixture of the two, where some of the components refer to code origins and others to abstract representations of permissions.

(iv) At the other extreme, a simple bit pattern (a mask) that represents which rights are present and which are not. This representation is particularly efficient; the bit pattern may be held in a register. This representation is applicable in the case where there is a fairly limited and fixed set of rights. (In general, however, rights may be represented by objects of a class Permission, as indicated above.)

Updating

Concerning point (5), the update is enforced automatically, every time a piece of code is executed, independently of the content of the code, so that security-unaware code is protected by default from untrusted code. (See the code examples below.) This mechanism can be efficiently implemented taking advantage of the following insights:

(i) The update can be skipped when the current rights are included in the static rights of the code. This inclusion can be determined by static analysis, and taken into account in calling conventions.

(ii) If the ways of going from one piece of code to another are method calls and returns, then the updates to the current rights need to happen only when there are method calls and returns. This can directly be extended to exception throwing and exception handling.

(iii) In this setting, an effective calling convention is that, whenever a call completes (either normally or with an exception), the current rights after the call must be included in the current rights before the call.

(iv) With this convention, the automatic update can be enforced by calculating an intersection of rights at most once for every call (before transferring control to the callee).

We expect most updates to be (conservatively) eliminated, for two reasons: many updates (including in particular many updates in direct calls) will not actually change the current permissions, and many updates are irrelevant (e.g., because the current permissions are not used). For implementing the remaining updates, we may use a combination of the following techniques:

For every method, we may use a source-language transformation that inserts a code prefix that explicitly performs the update. This transformation can be implemented on top of a platform with no specific support for security.

We may proceed similarly at a lower level in the JIT (just-in-time) compiler, using a machine-code prefix We may provide several entry points for the same methods, with and without the automatic update, so that the compiler can skip the update when compiling direct calls from code with the same static permissions (or lower static permissions).

In the case in which there is no amplification (or few amplifications), we may perform the intersection in the JIT compiler, as a method is compiled just before execution. (An amplification may force some recompilation later on.)

We may maintain a cache for common intersections. (We expect the same intersections to be computed again and again.)

Explicit Modification

Concerning point (6), the modification of rights is a sensitive operation, which should be done only with care and after adequate checking. Whereas the reduction of rights can happen automatically (as described in point (5)), this modification of rights requires an explicit step, which can be taken only by security-aware code. It may be an amplification or not. The explicit step gives us a specific point on which to focus auditing efforts, and also to place blame when things go wrong. Code that is not security-aware need not be concerned with such explicit management of rights.

From an implementation perspective, the explicit modification of rights can be quite efficient, and can benefit from static analysis much like the automatic updates discussed in point (4).

Programming Patterns

As for point (7), we identify two useful programming patterns for the controlled modification of rights in security-aware code. These patterns, named "Grant" and "Accept", include the following operations:

GRANT: When running after less trusted code (e.g., when called by less trusted code):
check that the execution state is ok,
amplify rights (to a specific subset of the code's static rights), perform sensitive operations, and
reduce rights to their initial state.
(This pattern is analogous to certain explicit amplifications mechanisms used with stack inspection.)

ACCEPT: When running less trusted code (e.g., when calling less trusted functions):
save parts of the execution state,
perform untrusted operations,
check that the execution state is ok, and
amplify rights to their initial state.

Note that this pattern does not explicitly reduce rights before the untrusted operations: since these operations have limited static rights, this reduction occurs automatically.

These patterns are compatible with the efficient calling convention outlined above. In both cases, the operation that checks whether the execution state is ok depends on the security policy, and typically involves validating some of the values passed as parameters and checking the presence of some run-time permissions.

These patterns can be directly supported in programming languages, advantageously. We suggest some high-level programming-language mechanisms, and sketch their implementation in terms of lower-level operations on current rights. (A more detailed blueprint for C# is given below.) We extend the grammar of statements with two constructs, "Grant (P) {B}" and "Accept (P) {B}", where P is a subset of the static permissions to be amplified and {B} is a block of code containing the operations to be performed (and which are the scope of the constructs). Optionally, P may be omitted, its default value being all static permissions. These statements are executed as follows:

Grant (P) {B}: Before running B, the initial value of the current permissions is saved and the selected permissions P are added to the current permissions. When B completes (possibly by throwing an exception), the current permissions are assigned the intersection of their initial and final values. Note that Grant does not leak any extra right after completion of the block B, and preserves the loss of any right while running B.

Accept (P) {B}: Before running B, the initial value of the current permissions is saved. If B completes normally, the intersection of the initial permissions and P is added to the current permissions.

Thus, the code that executes Accept takes responsibility for the effect of the operations performed in the block B on the rest of the program. Therefore, B should contain any necessary checks on the execution state. Note that Accept does not provide any extra right before the completion of B.

In particular, Accept can be used to imitate the behavior of stack inspection, when that is desired. For that purpose, the programmer should explicitly accept results of calls.

FIGS. 3A–3D

Figure 3A:
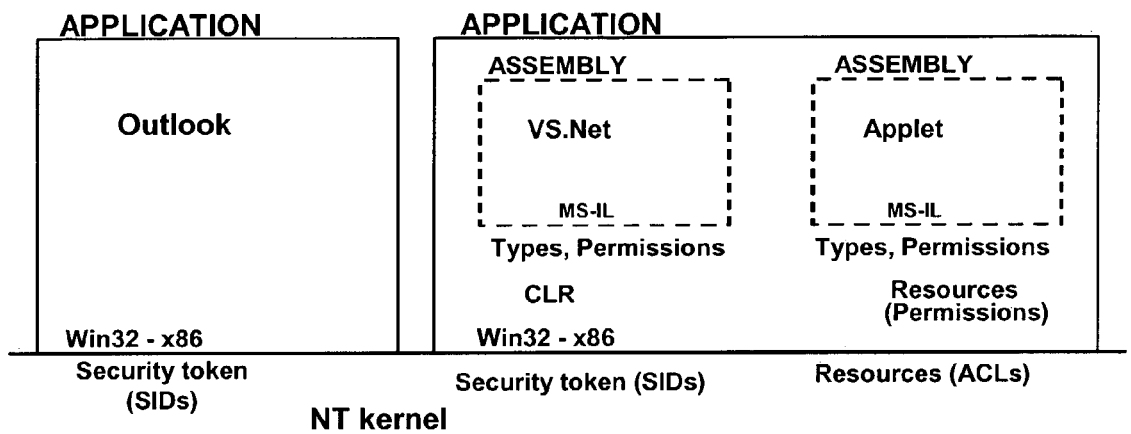
FIGS. 3A–3E illustrate the confused deputy problem and stack inspection approach in accordance with the prior art.

FIG. 3A illustrates a layered architecture for access control. Managed applications run within the CLR (which runs itself as an application on top of a WINDOWS® NT® operating system kernel). Fine-grained access control is managed by the CLR, using types and permissions plus stack inspection or some alternative such as the one described herein. Coarse-grained access control (for all the rights accessible from CLR applications) is managed by the operating system, using security tokens (SIDs) and access control lists (ACLs).

Figure 3B:
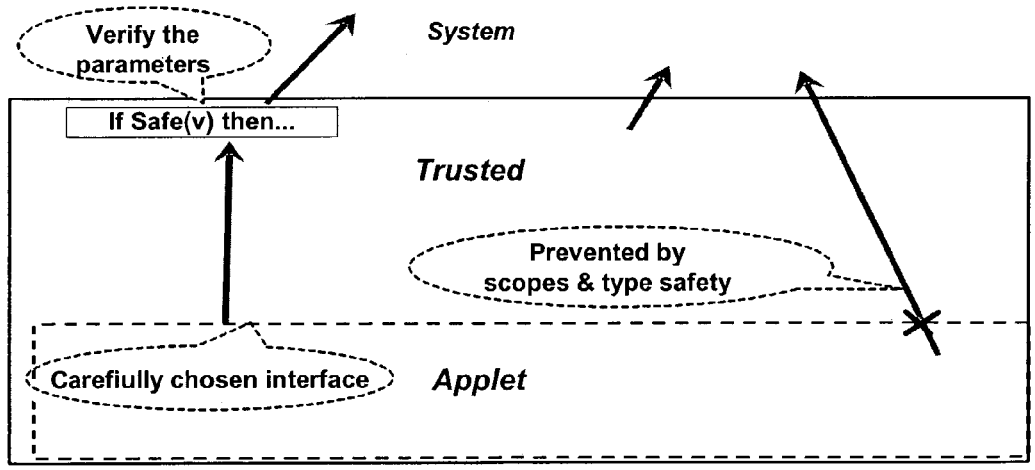

FIG. 3B illustrates a simple set mechanism for access control for untrusted code (basically, a plain sandbox). Arrows represent function calls. Trusted code can perform sensitive operations, such as system calls. Untrusted code (here represented as the Applet shown within the dash-line box) cannot directly perform sensitive operations; instead, it can call a small number of trusted library functions (if safe(v) then . . . ) that carefully check their arguments before performing sensitive operations.

Figure 3C:
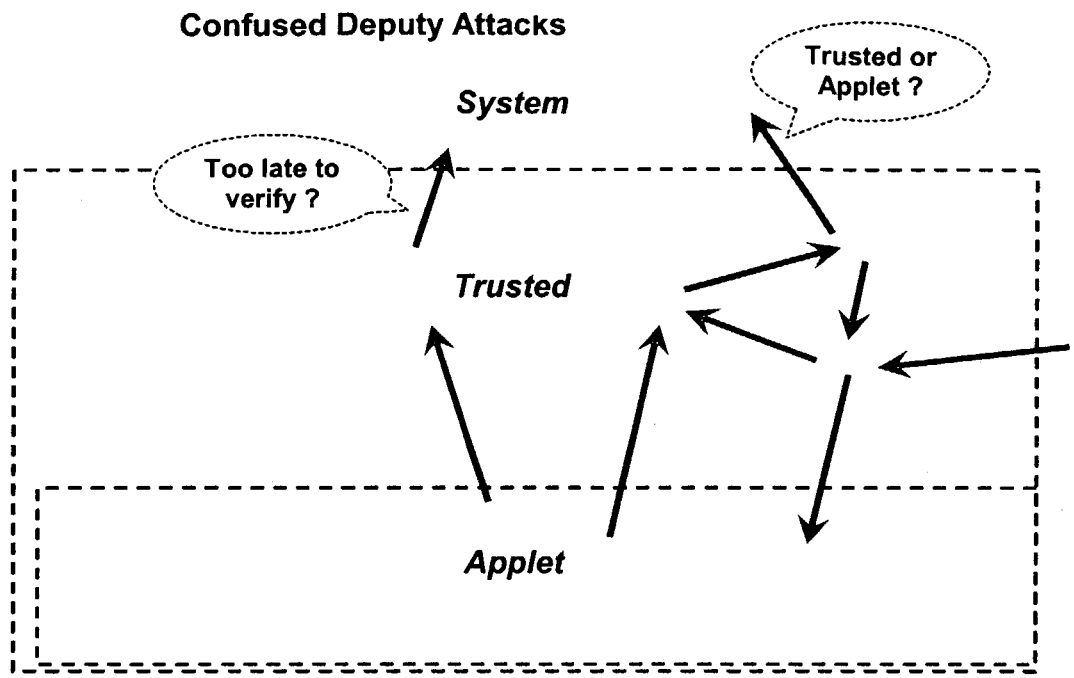

FIG. 3C illustrates the confused deputy problem. As the platform provides more services to (potentially untrusted) components, the control and data flows between untrusted code and sensitive operations becomes more complex. This makes it harder to systematically enforce access control.

Figure 3D:
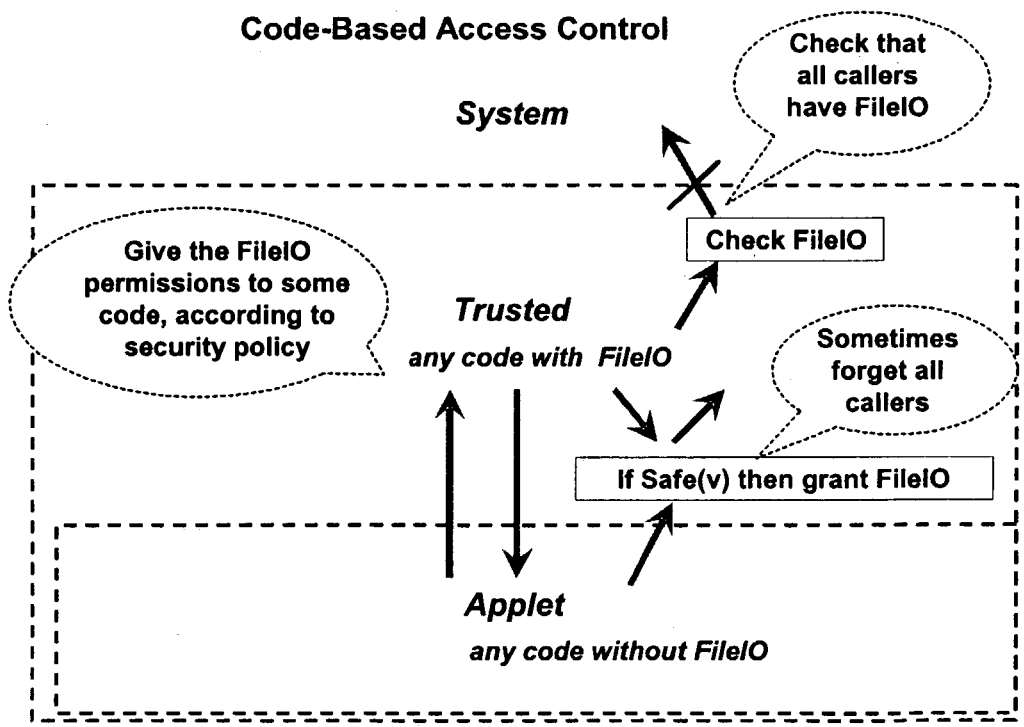

FIG. 3D depicts the usage of static rights attached to every piece of code to make access control decision, focusing on a single permission, referred to herein as FileIO, that is meant to protect access to the file system. The main design issue is to determine how (and when) static permissions are composed at run-time. The resulting effective permissions are tested before performing sensitive operations.

Figure 3E:
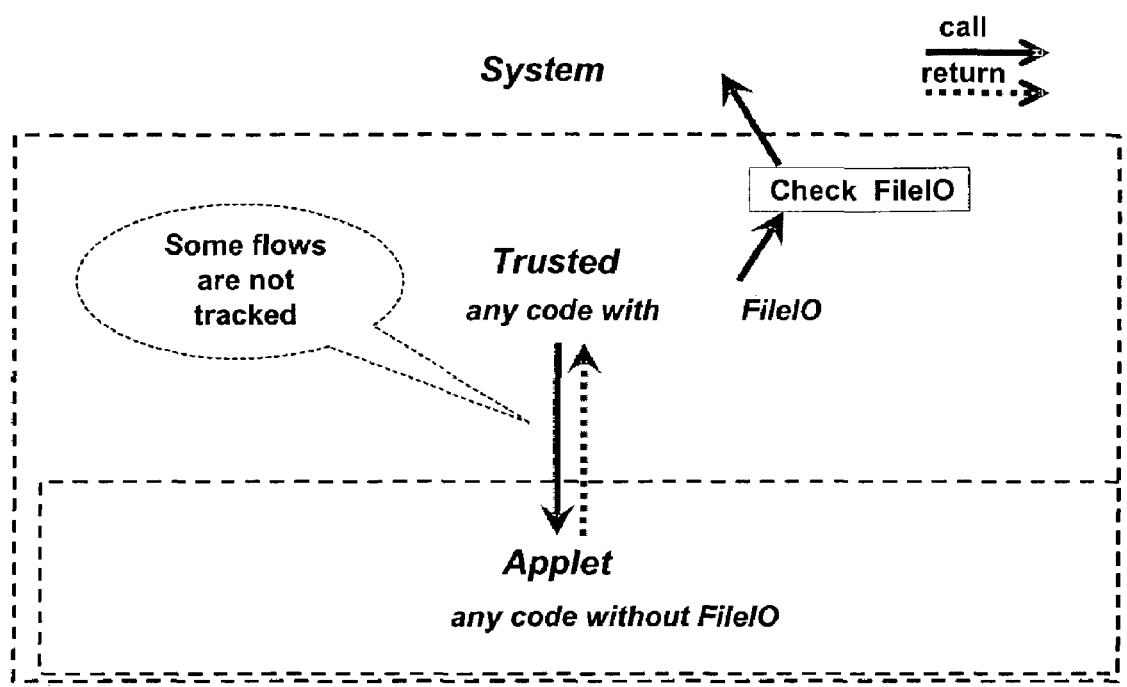

FIG. 3E illustrates the limitations of stack inspection: some control and data flows are not tracked in the stack. For instance, when trusted code uses values returned by untrusted code, no untrusted code appears on the stack anymore. The dashed arrows represent returns of calls.

FIGS. 4A–4D

With the background provided by the foregoing summary with reference to FIGS. 3A–3E, we will now explain the history-based access control approach of the present invention.

FIGS. 4A through 4D illustrate a general architecture for access control using history-based rights. The case depicted involves two components and one permission, FileIO. Arrows labeled "Trusted" represent interactions occurring with this permission in the current rights, and arrows without such labels represent interactions occurring without this permission in the current rights. Plain arrows represent function calls, and dotted arrows represent function returns and other interactions.

Figure 4A:
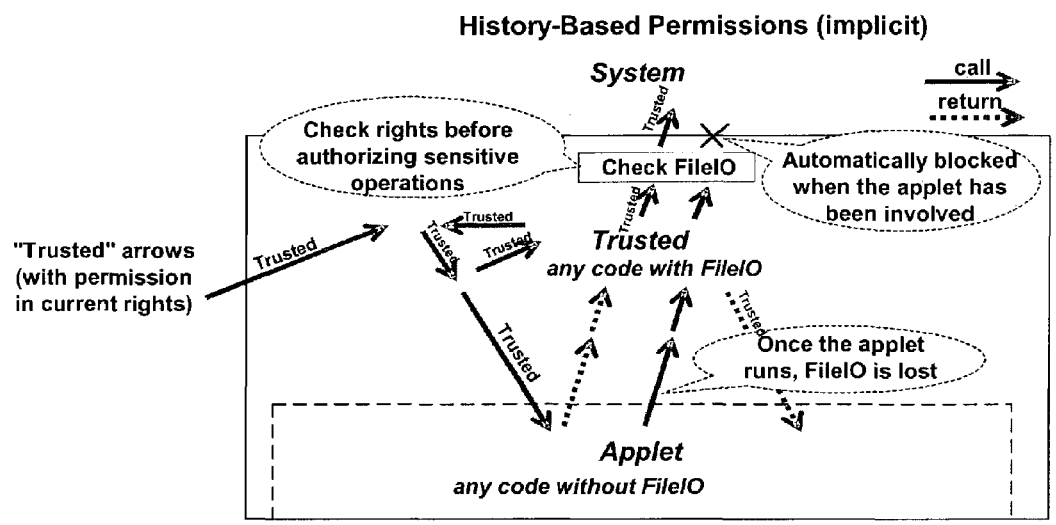
FIGS. 4A–4D illustrate a general architecture for access control using history-based rights.

FIG. 4A illustrates a basic case without amplification. Access to the file system succeeds only if FileIO is among the current rights. FileIO is automatically removed from the current rights when the applet runs.

Figure 4B:
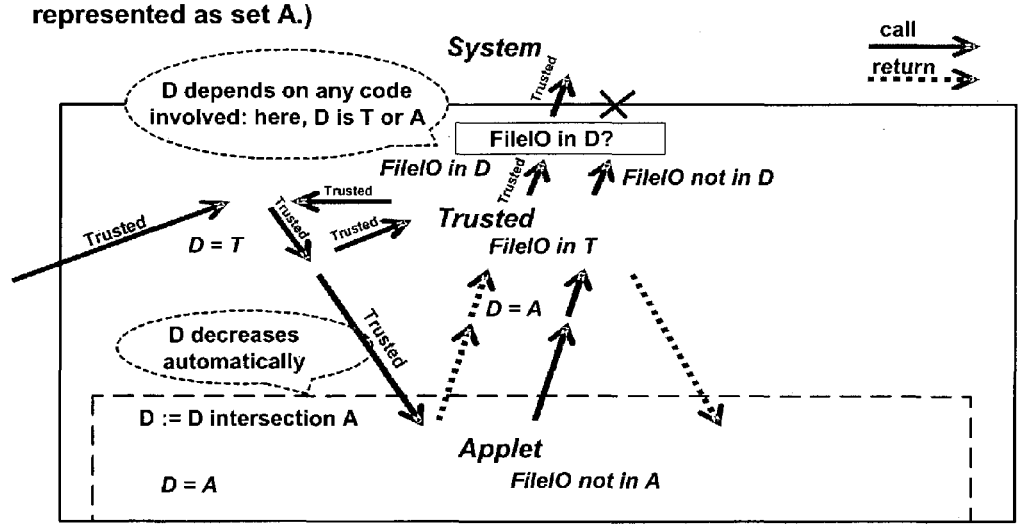

FIG. 4B illustrates the same case as FIG. 4A in more detail, making explicit the current rights (represented as a set D), in relation to the static permissions of the trusted code and of the applet (represented as sets T and A, respectively). Here, we assume that FileIO occurs in T but not in A, and that A is a subset of T. As long as the computation involves only trusted code, D equals T and the FileIO permission check succeeds. Once the applet gets involved, D equals the intersection of T and A (here, just A) and any subsequent check for the FileIO permission raises a security exception.

Figure 4C:
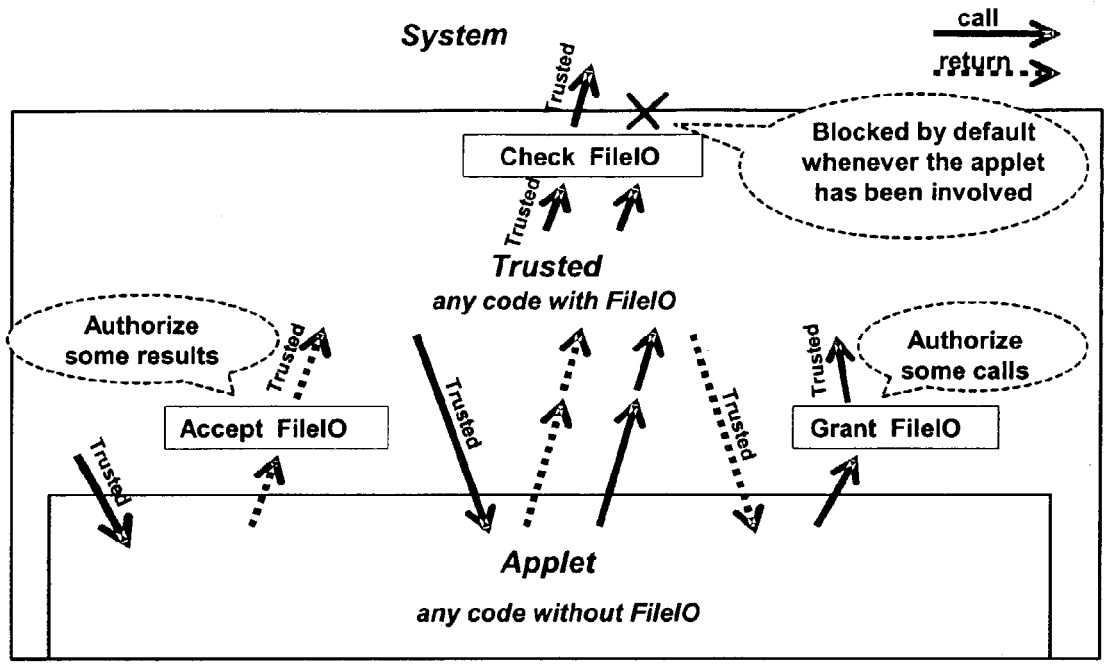

FIG. 4C supplements the case of FIG. 4B with the explicit amplifications of the current rights in trusted code, using the Accept and Grant constructs. By default, access to the file system succeeds when only trusted code is involved. In addition, access succeeds after calling the applet and explicitly accepting its result for FileIO, and when called by the applet and explicitly granting FileIO.

Figure 4D:
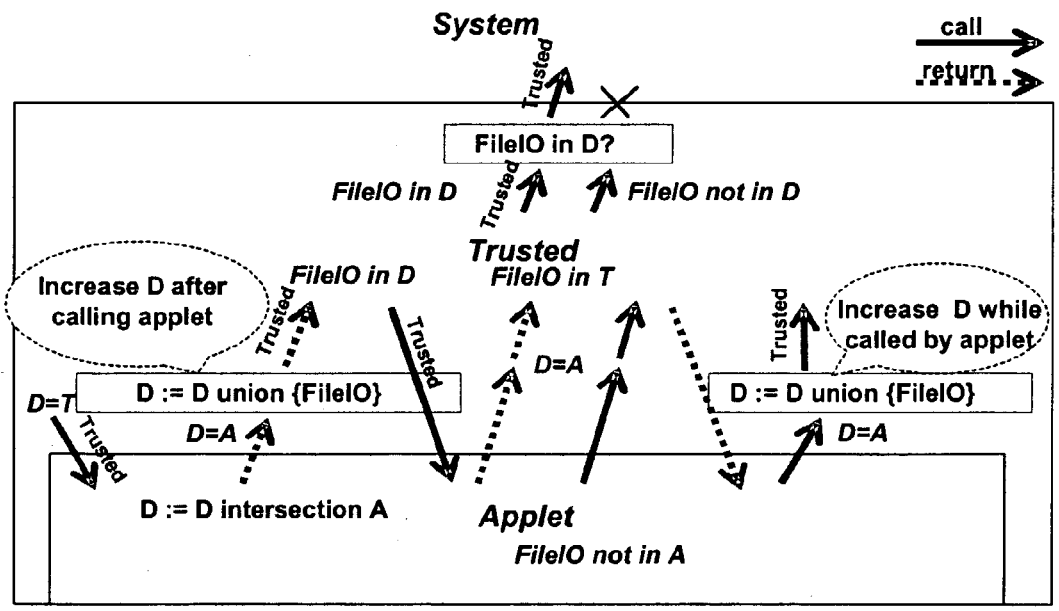

FIG. 4D illustrates the same case in more detail, making explicit the value of the current rights D. (Here, we assume that A and {FileIO} are disjoint subsets of T.)

Two Simple Examples in C#:

We illustrate our mechanism in two simple situations (without explicit assignments to the current rights). In both cases, untrusted code attempts to use some trusted-but-naïve code for deleting a sensitive file. The examples are written in C#.

EXAMPLE 1

In the first example, some untrusted code (such as an applet) calls some trusted code (such as a library) that in turn performs a sensitive operation (such as deleting a file). For this example, the situation is much like with stack inspection. We mention our assumptions on the respective static permissions in comments:

```
// Mostly untrusted: no FileIO permission
class BadApplet {
    public static void Main( ) {
        Library.CleanUp("../password");
    }
}
// Trusted: all FileIO permissions
class NaiveLibrary {
    public static void CleanUp(string s) {
        System.IO.File.Delete(s);
    }
}
```

The sensitive operation can be protected by requiring a permission (FileIO, in our example):

```
// Within System.IO: all FileIO permissions
class File {
    ...
    public static void Delete(string s) {
        FileIO.Demand(s, . . .);
        Win32.Delete(s);
    }
}
```

Here, FileIO.Demand(s, . . . ) checks that the permission to write s is available. Our history-dependent mechanism keeps track of the untrusted caller to the library, and automatically prevents the deletion of arbitrary files: when the invocation of the delete operation is the result of the execution of untrusted code, the check FileIO.Demand(s, . . . ) fails and raises a security exception. Thus, the naïve library is protected from untrusted callers.

The sequence of operations on the current rights goes as follow:

As control is transferred to the code of BadApplet.Main, the current permissions are intersected with the static permissions Of BadApplet, thereby removing FileIO from the current permissions.

As CleanUp, Delete, and Demand are invoked, the current permissions are intersected with the respective static permissions. If we assume that these functions have more static permissions than BadApplet, these intersections do not actually change the current permissions.

Finally, FileIO.Demand tests whether the current permissions contain FileIO and, since this is not the case, raises a security exception. This prevents the deletion of the file "../password".

EXAMPLE 2

In the second example, conversely, some trusted code (such as a local application) calls untrusted code (such as a plug-in), then proceeds with its result. Unlike stack inspection, our mechanism still prevents the deletion of the file.

```
// Trusted: all FileIO permissions
class NaiveProgram {
    public static void Main( ) {
        string filename = PlugIn.Tempfile( );
        System.IO.File.Delete(filename);
    }
}
// Mostly untrusted: no FileIO permission
class BadPlugIn {
    public static string TempFile( ) {
        return "../password";
    }
}
// Within System.IO: all FileIO permissions, exactly as above
class File {
    ...
    public static void Delete(string s) {
        FileIO.Demand(s, . . .);
        Win32.Delete(s);
    }
}
```

Operationally, the situation is much as in the first example:

Initially, the current permissions contain all the static permissions of NaiveProgram.

When PlugIn.Tempfile is called, the current permissions are intersected with the static permissions of BadPlugIn.

When BadPlugIn returns, and later in the computation, further intersections are performed, but the current permissions always remain included in those of BadPlugIn, hence they never contain FileIO.

Finally, FileIO. Demand raises a security exception, as above.

High-Level Constructs and their Implementation (in C#):

We include a blueprint of our two amplification constructs for C#, Grant and Accept, along with their implementation in terms of lower-level operations on the current rights, here represented as a static variable Permissions.Current.

```
// History-based permission computation for managed code:
// a high-level syntax and its lower-level translation
// (using imperative syntax; but declarative syntax is fine, too).
using System;
using System.Security;
using System.Security.Permissions;
// BASIC REPRESENTATION OF PERMISSION SETS
(USED BELOW)
public class Permissions {
    // dynamic permissions at this stage (global variable)
    // automatically intersected with the static permissions
    public static Permissions Current;
    // Set-based operations
    public static Permissions operator +(Permissions p, Permissions q)
{/*union*/}
    public static Permissions operator -(Permissions p, Permissions q)
{/*difference*/}
    public static Permissions operator ^(Permissions p, Permissions q)
{/*intersection*/}
    public static bool operator <=(Permissions p, Permission q) {/*test
for inclusion*/}
    // Security actions
```

```
        public void Demand( ) {
            if (!(this <= Current) )
                throw new SecurityException("Operation not permitted");
        }
        public void Deny( ) { Current = Current − this; }
        public void PermitOnly( ) { Current = Current ^ this; }
        ...
    }
    delegate int Code( ); // illustrates a basic interface to untrusted code
    // EXAMPLES
    public class Sample {
        // permissions given to any code for this class (when loaded)
        // initialized by the runtime, or explicitly obtained by reflection.
        static Permissions Static;
        // handpicked sets of permissions (application-specific)
        static Permissions prior; // defining what is a minimally-trusted
    valid caller
        static Permissions extra; // defining what is a valid privileged
    callee.
        // Basic case for libraries not meant to be used with less trusted
    code.
        // We simply detect any prior interaction with such code and give up.
        // This removes any uncertainty on the current permissions at this
    stage.
        public void Plain( ) {
            Static.Demand( );
            // run any sensitive code
        }
        // GRANT is a restricted form of privilege elevation
        // that temporarily gives extra permissions to a specific block
        public void LibraryGate( ) {
            // usually checks preconditions
            // such as the presence of some permissions
            prior.Demand( );
            // grant extra permissions for this block of code
            // (raises a security exception if !(extra <= Static))
            Grant (extra) {
                // run sensitive code requesting elevated privileges
            }
            // continue with ordinary code
        }
        // ACCEPT is a restricted form of privilege elevation
        // that restores some or all permissions possibly lost in
        // a specific block (for the benefit of any following code)
        private static int LibraryProxy(Code whatever) {
            int i;
            Accept (Static) {
                // runs code that may interact with semi-trusted code
                i = whatever( );
                // usually checks post-conditions;
                // by design, unhandled exceptions won't restore
                permissions.
                if (i<0) throw (new InvalidOperationException("bad
                integer"));
            }
            // continue with ordinary code
            return i;
            // from the caller's viewpoint, the resulting permissions are
            // the same as if the method had chosen i itself.
        }
        // IMPLEMENTATIONS
        // These two methods implement the design above, using lower-level
        // reads and writes to the global variable Permissions.Current
        public void ExplicitLibraryGate ( ) {
            if (!(prior <= Permissions.Current))
                throw (new SecurityException("Operation not permitted"));
            Permissions before = Permissions.Current;
            try {
                Permissions.Current = Permissions.Current + extra;
                // run sensitive code requesting elevated privileges
            }
            finally { // always cancel privilege elevation
                Permissions.Current = Permissions.Current ^ before;
            }
            // continue with ordinary code
        }
        private static int ExplicitLibraryProxy(Code whatever) {
            int i;
            Permissions before = Permissions.Current;
            {
                i = whatever( );
                if (i<0) throw (new InvalidOperationException("bad
                integer"));
            }
            Permissions.Current = Permissions.Current + (before ^ Static);
            // continue with ordinary code
            return i;
        }
    }
```

C. Conclusion

As mentioned above, while exemplary embodiments of the present invention have been described in connection with various computing devices and network architectures, the underlying concepts may be applied to any computing device or system in which it is desirable to provide an access control model and method for improving security. Thus, the procedures and systems described above may be applied to a variety of applications and devices. While exemplary data structures, programming languages, pseudo code, names and examples are chosen herein as representative of various choices, these are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as a gate array, a programmable logic device (PLD), a client computer, or the like. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the presently preferred embodiments, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. A history-based method for controlling access to resources of a computer system, comprising:
    (a) associating static rights with each of a plurality of pieces of code;
    (b) at run-time, associating current rights with each execution unit, wherein each execution unit involves the execution of one or more pieces of code;
    (c) storing the current rights in such a way that programs can access them;
    (d) when a given piece of code executes, updating the current rights for the associated execution unit by determining the intersection of the stored current rights of that execution unit with the static rights of the piece of code; and
    (e) using the updated current rights for controlling access to at least one resource of the computer system.

2. A method as recited in claim 1, wherein a piece of code is permitted to invoke an operation to modify the current rights provided that the current rights remain included in the static rights of this code.

3. A method as recited in claim 2, wherein the modifications of current rights are performed through programming constructs for granting rights or for accepting the results of calls.

4. A method as recited in claim 1, wherein the static rights of a piece of code are determined when the piece of code is compiled.

5. A method as recited in claim 1, wherein the static rights of a piece of code are determined when the piece of code is loaded.

6. A method as recited in claim 1, wherein current rights are associated with each execution unit at each of a plurality of points in time.

7. A method as recited in claim 1, further comprising the step of considering the current rights when a security decision is to be made.

8. A method as recited in claim 1, further comprising using the current rights in calls on services of an underlying operating system.

9. A method as recited in claim 1, wherein the static rights of a piece of code are represented in an object of a predefined class, and a predefined mechanism is employed to express the security policies that associate the piece of code with the object.

10. A method as recited in claim 1, wherein the execution unit comprises a thread.

11. A method as recited in claim 10, wherein, whenever a thread is forked, the new thread receives the current rights of its parent.

12. A method as recited in claim 1, wherein the execution unit comprises a collection of threads.

13. A method as recited in claim 1, wherein the execution unit comprises a process containing a plurality of related threads.

14. A method as recited in claim 13, wherein, whenever two threads join their current rights are intersected to determine the current rights of the merged thread.

15. A method as recited in claim 1, further comprising using the current rights in calls to execution environments on remote machines.

16. A method as recited in claim 1, wherein the current rights correspond to permissions in an underlying platform.

17. A method as recited in claim 1, wherein the current rights are stored in the form of a list of rights.

18. A method as recited in claim 1, wherein the current rights are stored in the form of a symbolic expression whose value represents a set of rights.

19. A method as recited in claim 1, wherein the current rights are stored in the form of a symbolic expression whose value represents a set of code origins.

20. A method as recited in claim 19, wherein the code origins are users and/or network addresses.

21. A method as recited in claim 1, wherein the current rights are computed as a function of the set of code origins.

22. A method as recited in claim 1, wherein the current rights are stored in the form of a bit pattern representing rights that are present and rights that are not present.

23. A method as recited in claim 1, wherein the updating of current rights is enforced automatically when the piece of code is executed.

24. A method as recited in claim 23, wherein the updating of current rights is skipped when the current rights are included in the static rights of the piece of code that is executed.

25. A method as recited in claim 23, wherein the updating of current rights is performed when there are method calls and returns.

26. A method as recited in claim 1, wherein the updating is performed using a source-language transformation that inserts a code prefix that explicitly performs the update.

27. A computer readable storage medium comprising executable instructions for performing the following steps:
    (a) associating static rights with each of a plurality of pieces of code;
    (b) at run-time, associating current rights with each execution unit, wherein each execution unit involves the execution of one or more pieces of code;
    (c) storing the current rights in such a way that programs can access them;
    (d) when a given piece of code executes, updating the current rights for the associated execution unit by determining the intersection of the stored current rights of that execution unit with the static rights of the piece of code; and
    (e) using the updated current rights for controlling access to at least one resource of the computer system.

28. A computer system, comprising a processor, memory and storage for executable code, and a mechanism for implementing a history-based approach for controlling access to resources of the computer system, wherein the history-based approach entails assigning rights to a piece of code at run-time by examining the attributes associated with other pieces of code that have run beforehand, including examining origins of the pieces of code that have run and any explicit requests to augment rights, said mechanism comprising:
    means for associating static rights with each of a plurality of pieces of code;
    means for associating current rights with each execution unit at run-time;

means for storing the current rights in such a way that programs can access them;

means for updating the current rights when executing a given piece of code by determining the intersection of the stored current rights with the static rights of that piece of code; and means for using the updated current rights for controlling access to at least one resource of the computer system.

29. A system as recited in claim 28, wherein a piece of code is permitted to invoke an operation to modify the current rights provided that the current rights remain included in the static rights of this code.

30. A system as recited in claim 29, wherein the modifications of current rights are performed through programming constructs for granting rights or for accepting the results of calls.

31. A system as recited in claim 28, wherein the static rights of a piece of code are determined when the piece of code is compiled.

32. A system as recited in claim 28, wherein the static rights of a piece of code are determined when the piece of code is loaded.

33. A system as recited in claim 28, wherein current rights are associated with each execution unit at each point in time.

34. A system as recited in claim 28, further comprising the step of considering the current rights when a security decision is to be made.

35. A system as recited in claim 28, further comprising the step of considering the current rights when security information is to be communicated.

36. A system as recited in claim 28, wherein the static rights of a piece of code are represented in an object of a predefined class, and a predefined system is employed to express the security policies that associate the piece of code with the object.

37. A system as recited in claim 28, wherein the execution unit comprises a thread.

38. A system as recited in claim 37, wherein, whenever a thread is forked, the new thread receives the current rights of its parent.

39. A system as recited in claim 38, wherein, whenever two threads join their current rights are intersected to determine the current rights of the merged thread.

40. A system as recited in claim 28, wherein the execution unit comprises a collection of threads.

41. A system as recited in claim 28, wherein the execution unit comprises a process containing a plurality of related threads.

42. A system as recited in claim 28, further comprising using the current rights in calls on services of an underlying operating system and in calls to execution environments on remote machines.

43. A system as recited in claim 42, wherein the current rights correspond to permissions in a platform, such as restricted tokens of an underlying NT operating system.

44. A system as recited in claim 28, wherein the current rights are stored in the form of a list of rights.

45. A system as recited in claim 28, wherein the current rights are stored in the form of a symbolic expression whose value represents a set of rights.

46. A system as recited in claim 28, wherein the current rights are stored in the form of a symbolic expression whose value represents a set of code origins.

47. A system as recited in claim 46, wherein the code origins are users and/or network addresses.

48. A system as recited in claim 28, wherein the current rights are computed as a function of the set of code origins.

49. A system as recited in claim 28, wherein the current rights are stored in the form of a bit pattern representing rights that are present and rights that are not present.

50. A system as recited in claim 28, wherein the updating of current rights is enforced automatically when the piece of code is executed.

51. A system as recited in claim 50, wherein the updating of current rights is skipped when the current rights are included in the static rights of the code.

52. A system as recited in claim 50, wherein the updating of current rights is performed when there are system calls and returns.

53. A system as recited in claim 28, wherein the updating is performed using a source-language transformation that inserts a code prefix that explicitly performs the update.

54. A history-based method for controlling access to resources of an extensible software system including managed code, comprising:

(a) associating static rights with each of a plurality of pieces of code;

(b) at run-time, associating current rights with each execution unit, wherein each execution unit involves the execution of one or more pieces of code;

(c) storing the current rights in such a way that programs can access them;

(d) when a given piece of code executes, updating the current rights for that execution unit by determining the intersection of the stored current rights with the static rights of the piece of code; and (e) using the updated current rights for controlling access to at least one resource of the computer system.

* * * * *